United States Patent

Motl

[15] 3,686,954
[45] Aug. 29, 1972

[54] AUTOMOBILE AIR CONDITIONER TEST AND SERVICE EQUIPMENT

[72] Inventor: Daniel M. Motl, New Brighton, Minn.

[73] Assignee: Allied Power Industries, Inc., Milwaukee, Wis.

[22] Filed: April 8, 1971

[21] Appl. No.: 132,309

[52] U.S. Cl. .................73/432 R, 62/125, 116/129 T
[51] Int. Cl. ............................................G01m 19/00
[58] Field of Search.......73/168, 432 R; 62/125, 127, 62/129, 130

[56] References Cited

UNITED STATES PATENTS

| | | | |
|---|---|---|---|
| 2,178,020 | 10/1939 | Kucher | 73/432 R |
| 2,733,600 | 2/1956 | Sahs | 73/432 R |
| 3,082,951 | 3/1963 | Kayan | 62/127 |
| 3,086,392 | 4/1963 | Ehrens | 73/168 |

*Primary Examiner*—S. Clement Swisher
*Attorney*—Frederick E. Lange, William C. Babcock and Jon F. Tuttle

[57] ABSTRACT

Electronically automated equipment utilized for diagnostic evaluation and repair of automobile air conditioning systems. Test connections provide sensors to measure the various pressures and temperatures in the operating system which are selectively connected to appropriate readout devices. Various hand actuated switches are provided to sequentially actuate the respective test circuits. If the circuits indicate a fault within the air conditioning system, the balance of the manually operated switches are operable to evacuate the system to enable repair and subsequently to recharge the system to an optimum operating condition. Additional features, in keeping with the electronic nature of the system, are capacitive measurement device to precisely determine the amount of refrigerant to be charged into the system, and a thermostatically controlled heater to assure suitable refrigerant temperature and pressure during the charging cycle.

11 Claims, 7 Drawing Figures

Patented Aug. 29, 1972

INVENTOR.
Daniel M. Motl
BY
Jno F. Tuttle
ATTORNEY

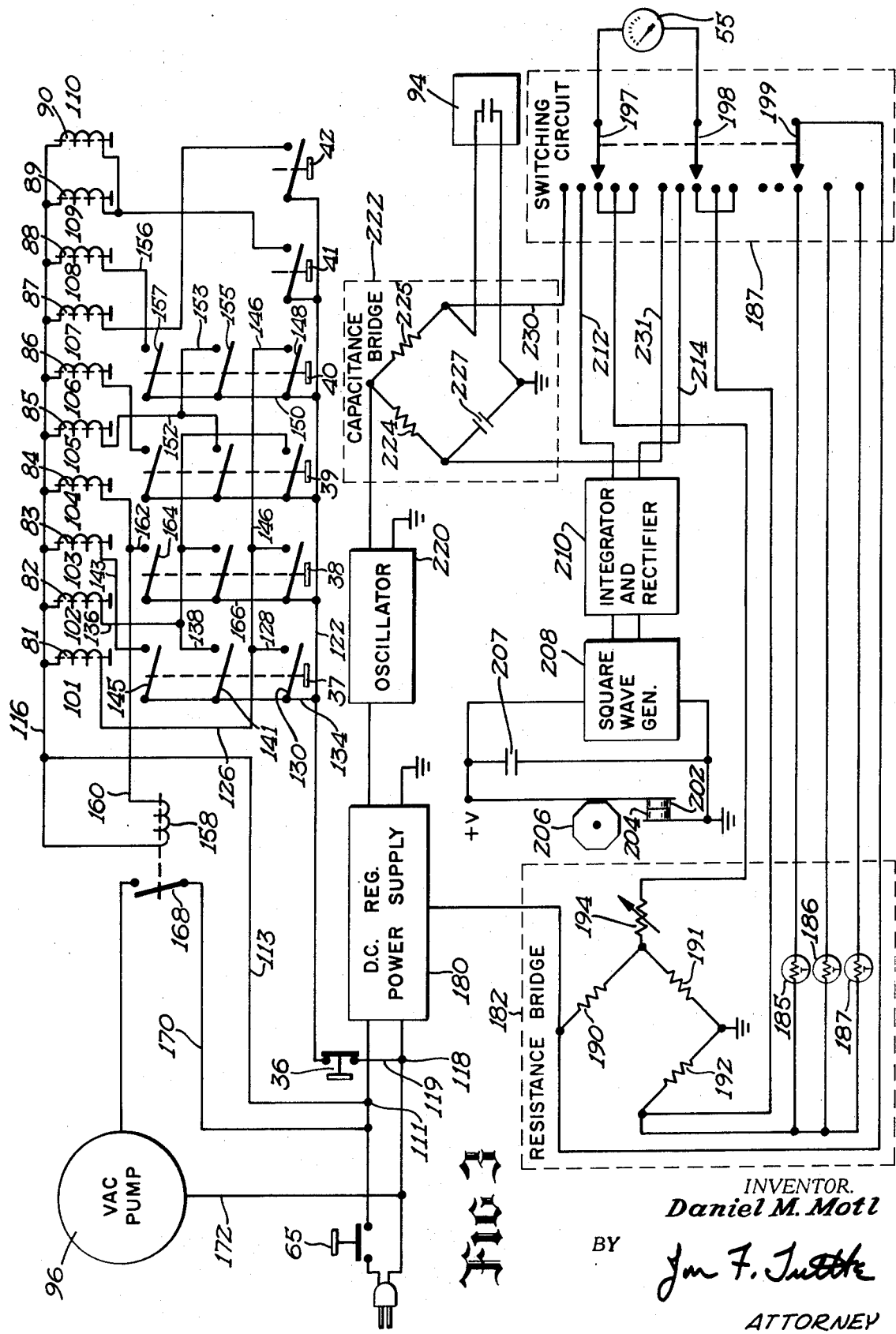

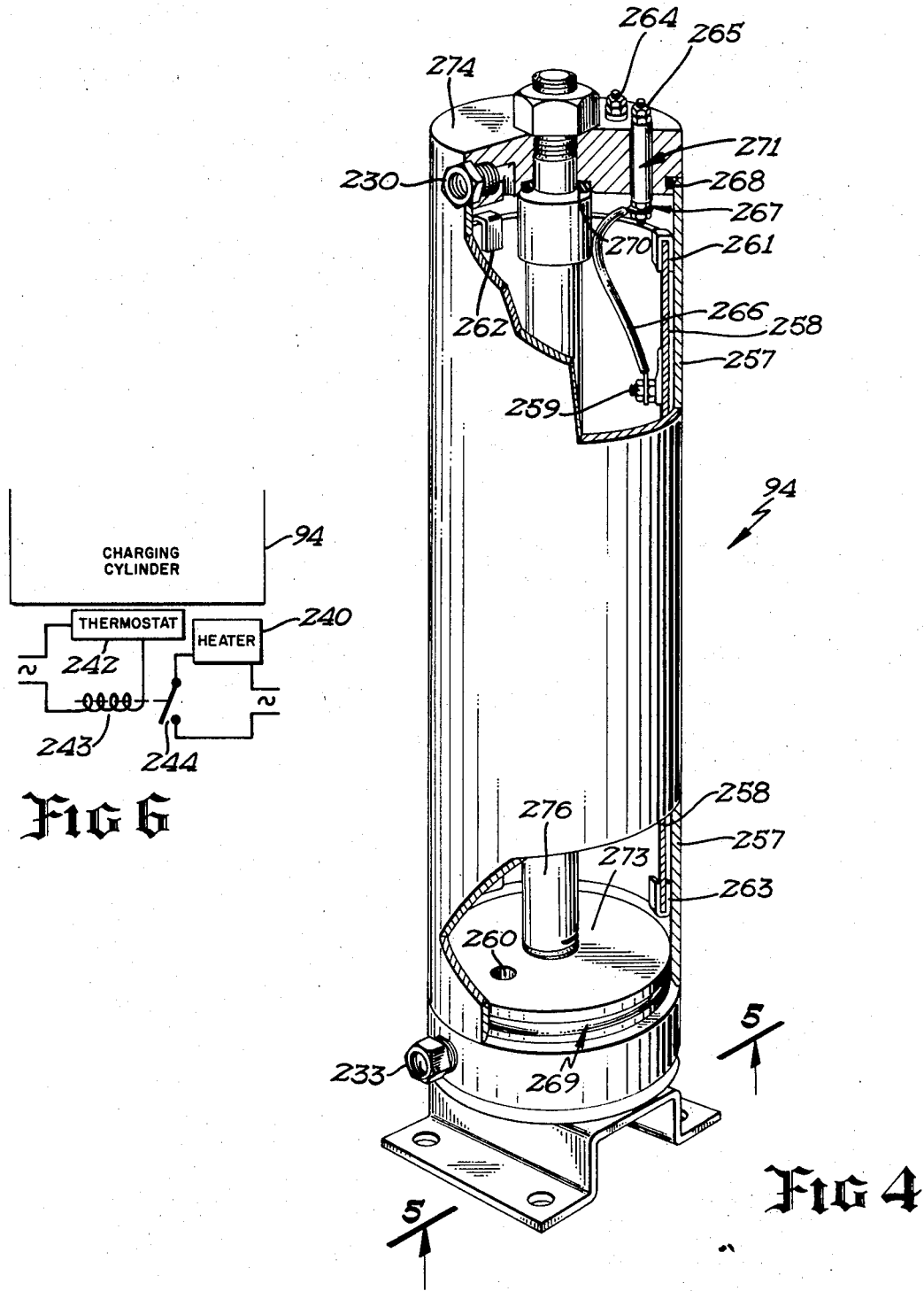

3,686,954

AUTOMOBILE AIR CONDITIONER TEST AND SERVICE EQUIPMENT

BACKGROUND OF THE INVENTION

The invention is designed to perform diagnostic testing and servicing of automobile air conditioners in a faster, simpler, and more reliable way than prior devices, thereby saving time and enabling the work to be done by a less skilled operator. Prior and existing devices have required the operator to refer to an operation's manual to determine how to hook up, valve by valve, each line and gauge prior to testing an air conditioning system. In addition, prior systems employ such devices as sight gauges to determine the amounts of refrigerant that is to be charged into an automobile air conditioning system. As is common with sight gauges, and particularly in an environment such as the one this invention is intended to be used, difficulties in reading the level are present due to the location of glass, which, of necessity, must be at the same level as the cylinder. Problems also arise because a sight glass is an absolute volumetric determinate which does not compensate for volumetric changes due to temperature changes. In the prior systems after diagnostic procedures and evaluation was complete, reference was again required to an operating manual to determine the proper arrangement and manipulation of the valves normally existing in a conventional system as well as the operational technique to accomplish servicing.

SUMMARY

The present invention due to automated electronic devices eliminates manual set up error throughout the performance of diagnosis and service. This is accomplished by providing electronic solenoid valves actuated by push button switches. Diagnosis is performed by sequentially actuating the switches, some of which control as many as three solenoid valves. The test results are electronically connected to a meter board which carries meters relevant to each of the tests and subsequent servicing. Utilized are specially created meter faces which indicate defects in the existing air conditioning unit and which are employed to correct those defects when servicing the air conditioning system. If recharging is necessary due to a low supply of refrigerant or repair of the system, precision measurement of the amount of refrigerant to be recharged is accomplished through the use of an electronic capacitive sensor integrally formed with the charging cylinder. This element of the invention not only provides a more accurate readout but essentially eliminates problems due to the location of the cylinder and temperature changes which normally interfere with accurate readings obtained from a sight gauge. Since the reading is electronic, it can be located at a point remote from the cylinder itself. Also, the reading is based on the mass or weight of refrigerant so that volumetric expansion of the liquid being measured, due to a temperature increase, does not change the reading. The charging cylinder is also provided with a thermostatically controlled heater which maintains the refrigerant temperature and pressure above that in the air conditioner, to insure an adequate flow rate when charging.

BRIEF DESCRIPTION OF THE DRAWINGS

FIG. 3 is a block diagram, in schematic form, showing the electrical circuitry of my invention;

FIG. 4 is a perspective view, partly in section, showing the refrigerant charging cylinder and associated capacitive element which enables a precision readout of the amount of refrigerant charged into the air conditioning system;

FIG. 6 is a schematic of the operating details of the ring heater; and

DESCRIPTION OF THE PREFERRED EMBODIMENT

Figure 1:
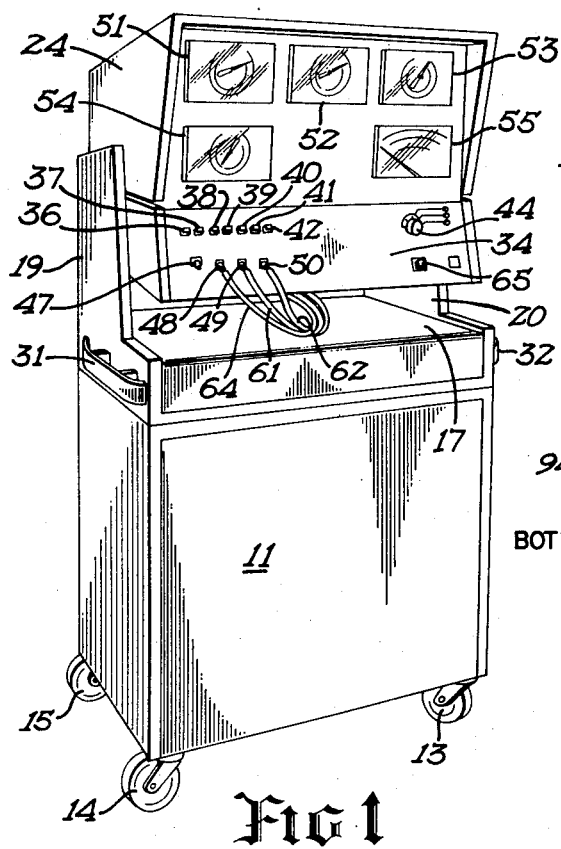
FIG. 1 is a perspective view, partly in section, showing my improved apparatus for diagnosing and servicing automobile air conditioning systems.

An understanding of the general appearance of the preferred embodiment may be readily obtained with reference to FIG. 1. To enable the operable connections and readout devices to be at a convenient eye level a base 11 is provided which is suitable for containing items useful in the operation of the apparatus. Provision may be made in the base portion of the apparatus for storage facilities, such as sliding drawers, to store the various tools necessary for hookup and repair of an automobile air conditioning system. Swivelly attached to each corner of the base are conventional caster wheels 13, 14, 15 to enable the apparatus to be readily portable. Fixedly secured to the top of the base 11 is a work table 17.

Supported above the work table by any suitable means such as the side members 19 and 20 shown in FIG. 1 is a housing 24 which contains a refrigerant storage drum, an evacuator pump, a charging cylinder with associated flow paths and the internal circuitry, all shown and discussed in greater detail below. As shown, handles 31 and 32 may be provided attached to the side members 19 and 20 to enable an operator to easily manipulate the portable diagnostic and service apparatus. On the face 34 of the equipment housing 24, push buttons 36–42 are provided which operate solenoid valves located internally in the housing (shown in FIG. 2) as well as an operating knob for a rotary switch 44 which connects the electronic sensing elements, such as thermistors, to the appropriate scale of the readout device 55. It should be understood that instead of the rotary switch 44 all switches could be push button for ease of operation. Also on the outer face of the housing are connectors 47, 48, 49, and 50 suitable for connection to pressure hosing 61, 62 and 64 to attach to the automobile air conditioning system. These pressure connections can be designated "bleed," "auxiliary low pressure," "system low pressure," and "system high pressure," respectively.

Figure 7:
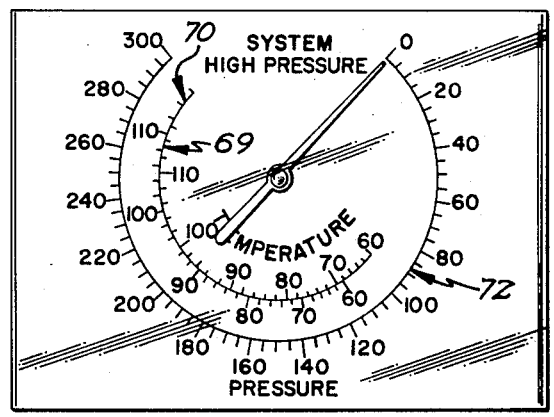
FIG. 7 shows one of the various dials which references ambient temperature which may be employed in my invention.

Also carried on the face of the housing are the meters 51–55 which indicate the operating parameters of the air conditioning system prior to and during testing. Meters 51 through 54 have dials designed to indicate "auxiliary low pressure," "system low pressure," "system high pressure," and "charging cylinder pressure," respectively. The low pressure meters 51, 52 are also inscribed with indicia at the low end to enable vacuum pressures to be read. Meter 55 selectively indicates pounds of refrigerant charged into the system, temperature, engine speed, and D.C. voltage. A unique feature of meter 53 is shown in greater detail in FIG. 7 and is discussed in greater detail below.

The unit is connected by means of flexible hoses 61 and 62 which extend from the "system low pressure" connection 49 and "system high pressure" connection 50 and are attached to the air conditioner "low side" and "high side" service fittings, respectively, (usually located on or near the air conditioning compressor). In the case of Chrysler Corporation vehicles having an evaporator pressure regulator (EPR) valve, a compressor suction fitting is provided and an additional hose 64 connection is made between the auxiliary low pressure fitting 48 of the tester and this compressor suction fitting. A thermistor temperature measuring system is included, with provisions for connecting three separate probes having flexible leads in sufficient length to permit monitoring temperatures at desired locations on or near the air conditioner. Exemplary locations of these thermistors would be the ambient air temperature near the condenser, the cold line temperature, and evaporator outlet air temperature which can be measured at a cold air vent in the passenger compartment. A voltage measuring feature is also incorporated, with clip leads, which can be connected to various electrical components such as the compressor clutch, fan motors and control switches and provision is made for reading all pressure, temperature and voltage values on the panel mounted meters 51–55 discussed above. The voltage measuring devices and pressure gauges may be conventional, and, as noted above, pressure reading capability should include the ability to read vacuum pressures as low as 30 inches of mercury. In the system described vacuum pressures are read at the low end of the pressure meters, 51 and 52.

The basic diagnostic procedure consists of operating the air conditioner until a stabilized condition is reached, then observing the system pressures which are transmitted through the hoses 61 and 62 (and hose 64, if used) and indicated by the gauges 52 and 53 on the front panel 34. These pressure readings are correlated with other observations, such as temperature, to provide an indication of various disorders such as loss of refrigerant, contamination of refrigerant, compressor malfunction or expansion valve malfunction.

When the testing procedure has been completed, the air conditioner is shut off. Then, depending on the test results, one or more of the following procedures may be required to service the air conditioner: addition of a partial refrigerant charge to facilitate lead testing or to correct a small refrigerant loss; bleeding all the refrigerant out of the system to permit repair or replacement of components; drawing a vacuum on the system to remove air, moisture and other contaminants; and adding a complete charge of fresh refrigerant, in a measured quantity complying with the manufacturers specification.

Figure 2:
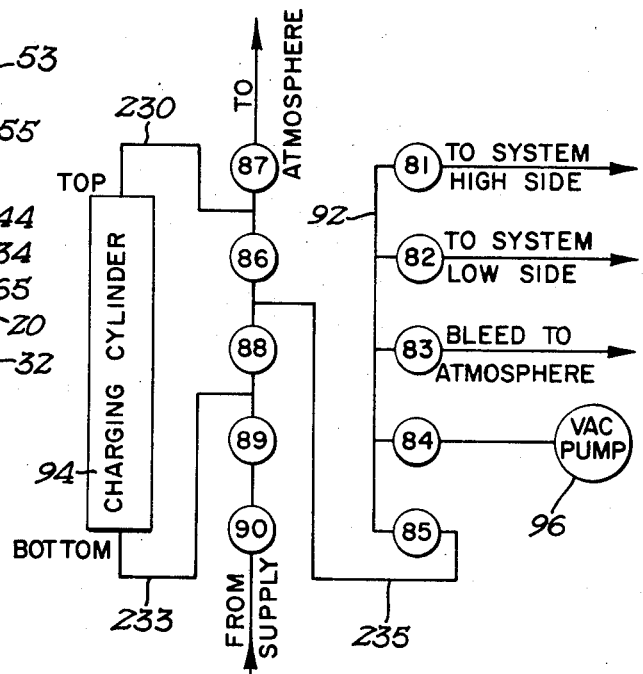
FIG. 2 is a schematic diagram showing the valve arrangement which allows flow of refrigerant from the charging cylinder to the air conditioning system being tested.

Initially all valves are closed, the hosing 61 and 62 going to the fittings 49 and 50 for the system low pressure and system high pressure are attached to the automobile air conditioning unit. The diagnosis and service apparatus is then energized by depressing first the power on-off button 65, shown in FIG. 1, and then sequentially the test button 36, also shown in FIGS. 1 and 3. As shown in FIG. 2, to assure that test conditions are not affected by the valving, the "Off/test" push button 36 disconnects the solenoid coils which operate the valves, while the test circuits remain energized.

The car is then started and run at a speed between 1,400–1,700 rpm, read on meter 55, with the air conditioner on full cold for approximately 10 to 15 minutes or until the pressure stabilizes. The gauge 52 readings for system low pressure should be between 15 to 30 psi for most automobile air conditioning systems which utilize no auxiliary valves. For Chrysler products which utilize an evaporator pressure regulator (EPR) valve the gauge 52 reading should be between 22 and 30 psi and for General Motors products which utilize a pilot operated absolute (POA) valve to prevent evaporator iceing, gauge 52 reading should be between 28 and 33 psi. The system high pressure should fall between pressures which correspond to ambient temperature within the range set forth on scale 69 and scale 70 in FIG. 7.

The scales 69 and 70 have been derived from the relationship which exists in the properly operating system between the high side refrigerant pressure, the condenser temperature and ambient temperature. A conventional pressure scale 72 is inscribed with appropriate indicia as occurs in a conventional system. The non-linear ambient temperature range limitations are set forth in units of temperature in a concentric scale circumferentially inscribed in radial alignment with the pressure scale. Temperature scales 69 and 70 are disposed upon opposite sides of a common base line, being displaced from each other circumferentially. Due to this arrangement, the operator need only determine whether the indicating pointer falls within the range limited by the actual ambient temperature as indicated on the two displaced scales 69 and 70. For example, for an ambient temperature of 90° the pressure reading opposite 90° on scale 69 is 175 psi and that opposite 90° on scale 70 is 195 psi. Thus for the ambient temperature of 90° the system high pressure should range between 175 psi to 195 psi. If either of these readings is above or below the expected reading, or if the thermistors indicate a problem in the air conditioner such as a high temperature in the car, then reference may be made to a technical manual which indicates approximately 15 diagnostic procedures to determine the nature of the defect in the air conditioner system.

Where, as is the case with Chrysler Corporation vehicles, a hose 64 is connected between the auxiliary low pressure fitting 48 of the tester and the compressor suction fitting of the air conditioner, the "auxiliary low pressure" read on meter 51 (corresponding to the compressor suction pressure) is compared with the "system low pressure" read on meter 52 (corresponding to the evaporator pressure). If the differential between these two pressures is too great or too small, then the evaporator pressure regulator is not working properly and it is necessary either to replace it or repair it.

The system mechanical and electrical circuitry utilized to perform the various testing and servicing functions are shown schematically in FIGS. 2 and 3. They show in block diagram form the interrelationship of the push buttons 36 to 42 and the solenoid valves 81 through 90 controlled thereby and the principles of their operation. Each solenoid valve 81 through 90 is operated by an associated solenoid coil 101 through 110, respectively. These solenoid coils are shown in FIG. 3. The solenoid valves are all of the normally closed type which are opened upon energization of their associated solenoid coil.

Referring to FIG. 2, the flow paths required for the various modes of operation are controlled by the 10 electric solenoid valves 81 to 90 which are energized to open in various combinations by the series of interlocked push-button switches 36 to 42 (as shown in FIG. 3). Five of these valves 81 to 85 are interconnected through a main control manifold 92 and the other five 86 to 90 are used to direct the flow to and from the charging cylinder 94. For purposes of clarity, the following chart lists these valves in numerical order with a brief description of the function of each.

| Valve No. | Description |
| --- | --- |
| 81 | System high side to manifold |
| 82 | System low side to manifold |
| 83 | Manifold bleed to atmosphere (through restricted orifice) |
| 84 | Manifold to vacuum pump |
| 85 | Charging cylinder to manifold (connects through valve 86 and 88) |
| 86 | Top of charging cylinder to manifold |
| 87 | Top of charging cylinder, bleed to atmosphere |
| 88 | Bottom of charging cylinder to manifold |
| 89 & 90 | Refrigerant supply to charging cylinder (two valves back to back) |

Seven push buttons 35–42 are used to operate the solenoid valves 81–90 in the required combinations. Six of these 36–41 are interlocked so that whenever one of them is depressed it will remain in that position until unlatched and will, at the same time, unlatch any of the other five buttons which was previously depressed. The seventh button 42 (designated "Cylinder bleed") works independently of the others 36–41 and remains depressed only when manually held in that position. The designation of the push buttons and their respective function is shown in the following table:

| Push Button Designation | Valves Energized | Description |
| --- | --- | --- |
| Off/test 36 | none | All valves closed. Test circuits remain energized. |
| System bleed 37 | 81, 82, 83 | Both sides of system bled to atmosphere through manifold 92. Restrictor incorporated in bleed line to limit flow velocity and prevent loss of oil. |
| Evacuate 38 | 81, 82, 84 | Both sides of system connected to vacuum pump 96 which also is energized by "evacuate" button 38. |
| Vapor charge 39 | 82, 85, 86 | Refrigerant in vapor form is drawn from top of charging cylinder 94 and enters low side of system. |
| Liquid charge 40 | 81, 85, 88 | Refrigerant in liquid form is drawn from bottom of charging cylinder 94 and enters high side of the system. |
| Cylinder fill 41 | 89, 90 | Refrigerant supply enters charging cylinder 94 from supply drum. |
| Cylinder bleed 42 | 87 | Refrigerant vapor bleeds to atmosphere from top of charging cylinder 94. |

As noted above, the air conditioner must be in operation during the functional testing procedure. It is also frequently desirable that it be in operation during the "vapor charge" condition so that the pumping action of the compressor will serve to assist the flow of refrigerant into the system. On the other hand it is important to avoid actuation of the "system bleed," "evacuate" and "liquid charge" functions unless the air conditioner has been shut off, as serious damage may otherwise occur. To guard against this possibility a pressure switch can be incorporated that senses the on or off condition of the air conditioner by responding to the changes in pressure which occur between these two conditions. Electrically the switch would be connected to prevent valves 81, 83, 84 and 88, and the vacuum pump 96, from being energized when the air conditioner is on.

As shown in the top of FIG. 3, the actuation of the ganged solenoid valves is accomplished through the use of the push buttons 37–42 mentioned earlier and shown in FIG. 1. These push buttons 37–42 have designations listed in the first column of Table 2. One side of all of the solenoid coils is energized from one side of the A.C. power source from point 118 through conductor 119 and switch 36 to bus bar 122. The other side of the solenoid coils is energized from point 111 on the power source through conductor 113 to the bus bar 116.

When the first push button 37, designated "system bleed," is depressed, switches 130, 141 and 145 associated therewith are closed and the solenoid coils 101, 102 and 103 of solenoid valves 81, 82 and 83 are energized as follows. Coil 101 is energized by a circuit extending from bus bar 122 through conductor 134, switch 130, conductors 128 and 126, solenoid coil 101, to the other bus bar 116. Solenoid coil 102 is energized by a circuit extending from bus bar 122 through conductor 134, switch 141, conductors 138 and 136, and solenoid coil 102 to the bus bar 116. Solenoid coil 103 is energized by a circuit extending from the bus bar 116 through conductor 134, switch 145, conductor 143, and solenoid coil 103 to the bus bar 116. As can be seen from FIG. 3 all of the combinations can be similarly traces. For example, the button 40 designated "liquid charge" actuates, from Table 2, valves 81, 85 and 88 which are energized as follows. Solenoid coil 101 is energized by a circuit extending from bus bar 122 through conductor 150, switch 148, conductors 146 and 126 and solenoid coil 101 to the bus bar 116.

Solenoid coil 105 is energized from a circuit extending from bus bar 122 through conductor 150, switch 155, conductors 153 and 152, and solenoid coil 105 to the bus bar 116, and solenoid coil 108 from bus bar 122 through conductor 150, switch 157, conductor 156 and solenoid coil 108 to the bus bar 116.

Additionally, in the evacuate cycle when both sides of the system are connected to the vacuum pump 96, the vacuum pump 96 is energized through a relay 158 which is energized by push button 38, energization being through a circuit extending from the bus bar 122 through conductor 166, switch 164, conductors 162 and 160, and relay coil 158 to the other bus bar 116. When this is energized, relay coil 158 pulls in relay switch 168 which energizes the vacuum pump 96 from one side of the primary source through conductor 170, relay switch 168, vacuum pump 96, and conductor 172 to the other side of the primary source. Thus, in addition to solenoid valves 81, 82 and 84 being opened, the vacuum pump 96 is energized.

The balance of FIG. 3 shows the circuitry, in block diagram and schematic form, which is utilized to obtain and monitor the applicable parameter values. A D.C. regulated power supply 180 supplies appropriate voltages. Temperature values are obtained utilizing a Wheatstone bridge circuit 182 in which the unbalance caused by temperature sensitive thermistors 185, 186 or 187 is read by the meter 55. A conventional switching circuit 187, is used to select the desired thermistor 185, 186 or 187 to be measured and the appropriate readout scale on the meter 55. As shown in FIG. 3, the balance of the Wheatstone bridge is comprised of resistors 190, 191 and 192, in the other legs of the bridge, as well as a calibrating resistor 194 in the meter circuit. The switching circuit, as shown in FIG. 3, is a three pole switch with two contacts being utilized to connect the meter across the appropriate bridge and the third contact being utilized to selectively insert the chosen thermistor 185, 186 or 187 into the bridge circuit. However, it should be understood that any switching circuit, such as a rotary switch 44 or a series of push-button switches, could be utilized.

Also shown in the center portion of FIG. 3 in block diagram form is the circuitry utilized to assure that the proper engine speed for testing is attained and its connection to the automobile engine. The numerals 202, 204 designate the conventional distributor switch commonly referred to as the "points." This switch is periodically opened and closed by a distributor cam 206 with a frequency depending upon the speed of the engine. Connected across the points is the conventional distributor capacitor 207. The voltage across the points is applied to the input terminal of a square wave generator 208 to produce a series of pulses of relatively uniform height and of a frequency corresponding to that of the voltage pulses across the distributor points 202, 204. These output pulses are in turn supplied to an integrator and rectifier 210 to produce a D.C. voltage, the magnitude of which is dependent upon the frequency of the pulses across the distributor points 202, 204 and hence upon the engine speed. The output voltage of this integrator and rectifier 210 is applied through lines 212 and 214 and contacts 197 and 198 of three pole switch 187 to the movement of the meter 55 to cause a deflection of the needle by an amount dependent upon engine speed.

The amount of refrigerant in the charging cylinder 94 is measured utilizing a capacitive measurement device which is discussed below. A conventional Colpitts oscillator 220 is employed to create an alternating signal through a capacitance bridge 222 which is used to measure the refrigerant mass. The basic elements of the capacitance bridge can be, as shown in FIG. 3, resistances 224 and 225 and a capacitance 227 comparable in magnitude to the expected range of the capacitance of the charging cylinder 94. The zeroing of the capacitance bridge 222 may be conventionally accomplished using the substitution method (not shown). As above, the appropriate meter scale is selected with the use of the switching device 187 wherein the meter 55 is connected across the bridge with leads 230 and 231. To utilize the same meter 55 a conventional diode bridge (not shown) should be used to convert the A.C. signal to D.C.

To gain a further understanding of the operation of the system assume that the diagnostic procedure has indicated a part must be repaired. The first step would be to bleed both sides of the automobile air conditioning system to atmosphere. This is accomplished by pressing push button 37 designated system bleed which opens valve 81, 82, and 83. As shown in FIG. 2, both sides of the system are bled to atmosphere, the high side through valve 81, through the manifold 92 and through valve 83 to atmosphere and the low side through valve 82, through the manifold 92, and through the valve 83 to atmosphere. The next step would be to repair or replace the defective component. Then the air conditioning system would be evacuated to remove air, moisture and other contaminants. This is accomplished by depressing the evacuate push button 38 to open valves 81, 82 and 84 and energizing the vacuum pump 96 by means of the circuitry mentioned earlier. Evacuation is accomplished in the same manner as above with valve 84 being opened, 83 and 85 being closed and both sides of the system being evacuated through valve 84 by the vacuum pump 96.

The addition of fresh refrigerant is accomplished by first depressing the "cylinder fill" button 41 which opens valves 89 and 90 causing refrigerant to flow from the supply drum through flow line 231, valves 90 and 89, and flow line 233 into the bottom of the charging cylinder 94. In the event the charging cylinder 94 contains excess back pressure due to pressure of air or the recent use of the heater 240 on a previous vehicle, then the cylinder 94 can be bled to atmosphere by depression of the push button 42 designated "cylinder bleed." This causes valve 87 to open and any vapor in the cylinder 94 will be discharged from the top of the charging cylinder 94 through flow line 230 and valve 87 to atmosphere thereby reducing the pressure in the charging cylinder 94 to a pressure lower than that in the supply drum so that the required flow of refrigerant will occur.

An indication of the exact amount of refrigerant in the charging cylinder 94 is useful when filling the charging cylinder, when transferring refrigerant to the air conditioning system (referred to as charging) and also at any time to determine whether there is a sufficient amount of refrigerant in the cylinder to accomplish an anticipated procedure. To indicate the exact amount of refrigerant in the charging cylinder 94, it is measured with a capacitive measuring circuit 222 and charging cylinder capacitance which compensates for ambient temperature in the manner described below.

Figure 5:
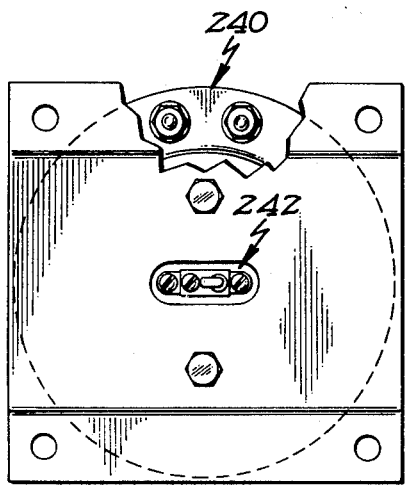
FIG. 5 is an end view partly in section taken along the line 5—5 by FIG. 4 which shows the ring heater utilized in the charging cylinder.

Most commonly the complete charging of an emptied system is accomplished through the use of the "liquid charge" button 40 which forces refrigerant in liquid form from the bottom of the charging cylinder 94 into the high side of the system. Depression of the "liquid charge" button 40, causes valves 81, 85 and 88 to open so that refrigerant flows from the charging cylinder 94 through flow line 233, valve 88, flow line 235, valve 85, through the manifold 92, and through valve 81 to the high side of the system. To assure that all refrigerant is forced into the system there is a ring heater 240, shown in FIG. 5 and schematically in FIG. 6, on the charging cylinder 94 which builds the pressure in the charging cylinder 94 to a pressure greater than that in the car and forces all refrigerant into the car in liquid form. As shown schematically in FIG. 6, thermostat 242 has contacts which are normally open when the charging cylinder is at a suitable temperature. If the temperature falls below the set point of thermostat 242 the contacts close and energize relay 243. When this occurs normally open relay switch 244 closes which energizes the heater 240. The heater 240 is powered by the normal full voltage of approximately 120 volts while the relay is energized by a substantially lower voltage which can be of the order of approximately 24 volts. This is done to maintain safety requirements due to the confined space in which the thermostat is located. Control circuitry may be provided to energize the heater 240 automatically whenever refrigerant is being transferred from the charging cylinder, and deenergize it at all other times. In some cases there is an excessive build-up of back pressure as charging continues so that the charging is slowed during charging of the last portion of the refrigerant. In such a case a "vapor charge" mode is provided. Vapor charge can also be used for partial charging. In both cases this is accomplished by depressing the "vapor charge" button 39 which causes valves 82, 85 and 86 to open so that refrigerant in vapor form is drawn from the top of the charging cylinder 94 and enters the low side of the system from flow line 230, through valve 86, through flow line 235, through valve 85, through the manifold 92, and through valve 82 to the low side. If this is to be done, the car is started and the suction of the air conditioning compressor pulls the vapor into the system.

To insure the proper amount of refrigerant to exactly meet the manufacturer's specifications a capacitive measuring system has been devised which is shown in FIG. 4. It is comprised of two concentric tubular conducting surfaces 257 and 258 separated by air and the liquid and vaporized refrigerant as the dielectric. As shown in FIGS. 2 and 4, the charging cylinder 94 is filled from the supply drum through line 231, valves 90 and 89, line 233 to the charging cylinder. It enters the bottom of the charging cylinder through a suitable passage way 260 which terminates in the bottom of the cylinder. Since the inner tubular conducting surface 258 terminates short of the bottom of the cylinder, the refrigerant and vapor can easily pass into the separation between surfaces 257 and 258. The outer tubular surface 257 forms the casing of the charging cylinder 94. The inner conducting surface 258 is a thin sheet of conductive material suitably spaced from the outer sheaths by nonconducting spacers 261, 262 and 263 formed out of a suitable acetal plastic such as Delrin.

Electrical contacts 264, 265 are provided to electrically connect the capacitive surfaces 257, 258 to the bridge circuit 195. As shown in FIG. 4, integrally formed with the inner conductive surface 258 is an electrical post 259. Post 259 is electrically connected to outlet post 265 by a lead wire 266 connected to electrical contact 267 which is joined with post connection 265 by a metal bolt and insulated from the top 274 with a suitably fitted insulating shield 271 also made of acetal plastic. O rings 268, 269, 270 are utilized to seal the top 274 and bottom 273 and the outer casing 257 and the inner orifice in the top 274 to the tie rod 276. The tie rod 276 is constructed from the same type aluminum alloy as the outer shell 257. This causes the shell 257 and the tie rod 276 to expand by the same amount when heated and assures that no leakage of joints will occur due to temperature changes.

Since the dielectric constant decreases in the same ratio as the density of the refrigerant, this form of measurement accurately indicates the correct weight or mass of refrigerant in the cylinder 94 regardless of volumetric changes due to varying temperatures. The approximate numerical value of capacitance of the device varies between 400 pf when the unit is empty to 800 pf when the unit is full.

In general, while I have described a specific embodiment of my invention, it is to be understood that this is for purposes of illustration only and that various modifications can be made within the scope of my invention. For example, rather than supporting the housing 24 with a base 11, it may be suspended from an overhead rack. Also all controls could be manually operable push-button switches rather than utilizing the rotary switch 44 shown in FIG. 1. Also the valving could be so arranged to reduce the number of valves, for example, by utilizing valves 86, 85 and 83 to release to atmosphere rather than valve 87. Provision may also be made to reclaim and retain the oil in the air conditioning system prior to and during evacuation of the refrigerant.

I claim as my invention.

1. Apparatus for diagnosis and servicing of an automobile air conditioning system using a refrigerant, comprising
   a housing;
   a plurality of pressure and temperature indicating devices adapted to be connected to said automobile air conditioning system and capable of providing an indication of a defective condition of said automobile air conditioning system;
   an evacuating system contained within said housing capable of withdrawing all of said refrigerant from said air conditioning system;
   charging means contained within said housing capable of holding a sufficient amount of refrigerant to fully recharge said automobile air conditioning system;
   a plurality of flow paths interconnecting said automobile air conditioning system, said evacuating system, said refrigerant charging means, and atmosphere;
   a plurality of motor operated valves selectively operable to interconnect said flow paths;

motor means for said motor operated valves; and
means for actuating different combinations of said valves to selectively establish different combinations of said flow paths.

2. The apparatus of claim 1 wherein said means for actuating different combinations of said valves includes a plurality of manually operated actuators, one for each of a plurality of test or repair operations, electrically connected to said motor means for said motor operated valves and wherein actuation of said manually operated actuators operates as many as three of said motor operated valves.

3. The apparatus of claim 1 further comprising capacitive measurement means integrally formed with said charging cylinder wherein the mass of refrigerant in both liquid and vapor form may be accurately detected prior to charging into said air conditioning system.

4. The apparatus of claim 1 further comprising heating means thermally connected to said charging means and temperature sensing means thermally connected to said charging means and electrically connected to said heating means whereby said temperature sensing means intermittently actuates said heating means to maintain a suitably high temperature in said charging means to maintain temperature stability and assure complete discharge of said refrigerant.

5. The apparatus of claim 1 wherein said plurality of pressure and temperature indicating devices includes at least one with indicia inscribed thereon which is utilized to indicate a pressure in said air conditioning system and further having at least two additional sets of indicia so inscribed on the meter face so that a range of ambient temperature is referenced in such a manner that if the indication of said meter falls within said range, said air conditioning system is operating satisfactorily.

6. The apparatus of claim 5 wherein said two additional sets of indicia inscribed on said meter face are inscribed in units of temperature and are circumferentially displaced so that one set is in radial alignment with the lowest permissible pressure for any given temperature and the other set is in radial alignment with the highest permissible pressure for said given temperature whereby an operator can determine for any given temperature whether the pressure is within the permissible range for that temperature.

7. A meter face for indicating a range of permissible pressure for a given temperature, comprising
a pressure scale with indicia inscribed thereon in units of pressure;
a first temperature scale with indicia inscribed thereon in units of temperature and aligned with said pressure scale so that for any given temperature the lowest permissible pressure is indicated concurrently with said given temperature; and
a second temperature scale with indicia inscribed thereon in units of temperature offset from said first temperature scale and aligned with said pressure scale so that for any given temperature the highest permissible pressure is indicated concurrently with said given temperature, whereby an observer can determine whether the desired range of pressure is achieved by determining whether a given pressure falls within the temperature range limited by said first temperature scale and said second temperature scale.

8. The apparatus of claim 1 wherein said charging means includes a container suitable for containing said refrigerant and which further comprises
a first conductive surface integrally formed with said container or offset therefrom and extending to the bottom thereof;
a second conductive surface spaced from said first conductive surface and electrically insulated therefrom extending to the bottom of said container except for a passageway to allow said liquid to flow between said conductive surfaces;
electrical connecting means connected to said first conducting surface and said second conductive surface; and
electrical measuring means connected to said electrical connecting means suitable to determine the capacitance existing between said first and second conducting surface whereby the mass of both liquid and vapor of said refrigerant can be determined.

9. The apparatus of claim 8 wherein said container comprises an outer housing forming the side wall of said container; a top formed so that it hermetically seals said housing to form said container; and at least one tie rod extending the length of said container to hold the top on said outer housing and wherein said outer housing and said tie rod are formed of the same material whereby they are equally expansible so that the apparatus maintains a suitable seal during temperature changes.

10. The apparatus of claim 8 further comprising heating means thermally connected to said charging means and temperature sensing means thermally connected to said charging means and electrically connected to said heating means whereby said temperature sensing means intermittently actuates said heating means to maintain a suitably high temperature in said charging means to maintain temperature stability and assure complete discharge of said refrigerant.

11. The apparatus of claim 1 further comprising
means for indicating engine speed electrically connected to said automobile whereby an optimum operating speed can be maintained during testing.

* * * * *